Figure 1:
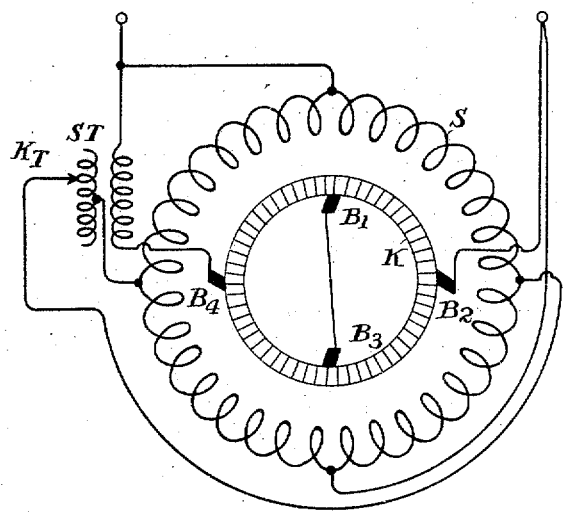

E. ARNOLD & J. L. LA COUR.
ELECTRIC MOTOR.
APPLICATION FILED OCT. 5, 1908.

970,412.

Patented Sept. 13, 1910.

UNITED STATES PATENT OFFICE.

ENGELBERT ARNOLD, OF KARLSRUHE, GERMANY, AND JENS LASSEN LA COUR, OF VESTERAS, SWEDEN.

ELECTRIC MOTOR.

970,412.    Specification of Letters Patent.    Patented Sept. 13, 1910.

Original application filed May 15, 1905, Serial No. 260,521. Divided and this application filed October 5, 1908. Serial No. 456,318.

*To all whom it may concern:*

Be it known that we, ENGELBERT ARNOLD and JENS LASSEN LA COUR, a subject of the Emperor of Germany, residing at Karlsruhe, in the Grand Duchy of Baden, Germany, and a subject of the King of Denmark, residing at Vesteras, Sweden, respectively, have invented certain new and useful Improvements in Electric Motors, of which the following is a specification.

The following invention relates to that class of compensated single phase commutator motors whose rotor winding is formed into two circuits, one of which is short circuited by brushes bearing on the commutator and has substantially the same magnetic axis as the stator winding, and the other of which is supplied by brushes with current from the source and has its magnetic axis displaced ninety degrees from the former. The latter rotor circuit excites the field of the motor. In order to start the motor and to regulate its speed, this magnetic field has to be varied independently from the current flowing in the other circuits and this is done in our invention by disposing an auxiliary winding upon the stator, displaced ninety degrees from the above mentioned stator winding and having therefore the same magnetic axis as the exciting circuit of the rotor. Thus both, the rotor winding and the auxiliary stator winding coöperate in the excitation of the magnetic field and in varying the number of ampere turns of the auxiliary winding the strength of the field may be varied.

In our application Serial No. 260,521, filed May 15, 1905, of which this is a division, we vary the speed of our shunt motor described therein by varying the number, and direction of the ampere turns of our auxiliary winding. This regulation does not give a good power factor and efficiency at all speeds as will be seen from the following: Having a constant pressure at the terminals of the main stator winding the cross flux is inversely proportional to the speed, being strong at low speeds and weak at high speeds, thus the losses at low speeds are high. The stronger field requires a higher excitation current and pressure, if these are smaller than required, the flux of the main stator winding and its counter E. M. F. will also be too small and the stator takes up a large wattless current. Therefore in addition to the regulation of the auxiliary winding we apply the following arrangements. We regulate the excitation voltage or we regulate the pressure per turn of the main stator winding, either by varying its pressure or by varying its number of turns. Both regulations, that of the excitation voltage and that of the pressure per turn of the main stator winding may also be used simultaneously. By these means the saturation of the stator core, and the counter E. M. F. of the main stator winding may be kept in suitable limits and the wattless stator current may be avoided.

Figure 2:
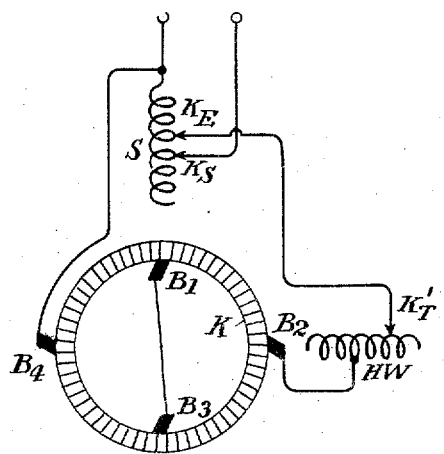
Figure 3:
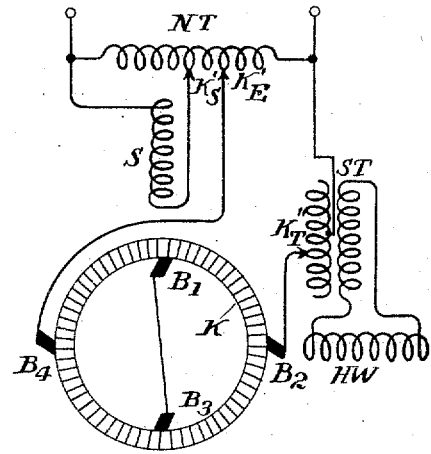

In the accompanying drawings, Figures 1, 2 and 3 show diagrams of different forms of our invention.

Fig. 1 is a diagram of connections of a shunt motor having a closed distributed stator winding S, supplying both main and auxiliary fields. The main field is on the axis of the short-circuited brushes $B_1$, $B_3$, the line terminals being connected in line therewith. The auxiliary field is supplied through the secondary of the series transformer ST, connected to the stator winding at points opposite the brushes $B_2$, $B_4$ and may be controlled as to strength or direction by means of the adjustable contact $K_T$. It will be observed that the connected brushes $B_1$, $B_3$ short-circuit the commutator K of the rotor on the line of the main or compensating field and current lead into the rotor through the brushes $B_2$, $B_4$ coöperates with the current supplied to the stator coils by the transformer secondary to produce a cross-field, the main and auxiliary field being in quadrature.

In Fig. 2 is shown a shunt motor having means for regulating the ampere turns of both stator coils. $K'_T$ is the movable contact for regulating the auxiliary winding HW producing the cross-field. $K_S$ is a movable contact for including more or less turns of the main stator coil S in circuit, while the contact $K_E$ may be used to regulate the excitation pressure of the shunt circuit. The two contacts $K_E$ and $K_S$ may be combined into a single contact.

According to another arrangement shown in Fig. 3, which shows another form of shunt motor we avoid the use of movable contacts at the motor by employing transformers. A single coil transformer NT is connected across the power terminals and the pressures of the main stator winding and of the shunt circuit are regulated by means of the respective contacts $K'_E$ and $K'_S$. The transformer ST supplies the current to the auxiliary stator winding, the primary coil being in series with the rotor and the number of primary turns of the transformer being regulated by means of the contact $K''_T$ in order to vary and reverse the ampere turns of the auxiliary winding.

In the construction shown in Figs. 2 and 3 the speed is varied by varying and reversing the ampere turns of the auxiliary winding HW, and in order to bring about the proper saturation of the stator core the voltage per turn of the stator winding is varied. This is accomplished in Fig. 2 by varying the number of turns, the voltage remaining constant, and in Fig. 3 by varying the voltage, the number of turns remaining constant. Both constructions are also provided with means for adjusting the proper electromotive force impressed upon the rotor winding.

Instead of using movable contacts the variable windings shown in Figs. 2 and 3 may in a practical arrangement be subdivided in a certain number of parts, which can be connected up in different ways for varying the number and direction of their ampere turns in the manner shown in our application Serial Number 260,521.

In accordance with this invention the speed is varied primarily by varying the ampere turns of the auxiliary winding, and the proper magnetic saturation of the stator core and, therefore, a proper counter E. M. F. of the stator winding is obtained by varying the voltage per turn of the main stator winding. In this way a large wattless current is avoided. The proper magnetic saturation of the stator core is in the particular embodiment obtained by varying the voltage per turn of the main stator winding, and this is accomplished by varying the number of turns, or by varying the impressed voltage. The function, therefore, of this variation of the voltage per turn of the stator winding is not primarily to vary the speed of the motor, for this is accomplished by the auxiliary winding, but its function is to control the magnetic saturation of the stator core, and therefore, the counter electromotive force of the stator winding, and thus avoid excessive flow of current.

In the arrangement shown in Fig. 2, the auxiliary cross-field stator winding HW is directly connected in series with the rotor on the axis of the brushes $B_2$ $B_4$ while in Figs. 1 and 2, this stator winding is inductively connected in series with the rotor through the series transformer ST. There is thus a series connection between the winding HW and the brushes in line with the magnetic axis thereof in each of the arrangements illustrated and means for varying the ampere turns of this winding to control the cross-field and the torque of the motor.

Having thus described the invention what is claimed is,

1. In an alternating current motor, in combination, a rotor winding provided with a commutator, brushes bearing on the commutator, a set of said brushes connected to a source of current and forming the exciting circuit, a second set of said brushes short circuiting the rotor winding on a line displaced from the first set and forming the compensating circuit, and stator windings including a main portion arranged to produce a magnetization along the line of the second set of brushes, and an auxiliary portion connected in series with the first set of brushes and arranged to produce a magnetization along the line of the first set of brushes, the circuit containing the auxiliary portion and first set of brushes being connected in shunt to the main portion across said source of current.

2. In an alternating current motor, in combination, a stator winding having connections for supplying current thereto, said winding comprising main and auxiliary coils whose magnetic fields are in quadrature, a rotor having a winding provided with a commutator, a set of connected brushes bearing on said commutator and short-circuiting the rotor winding on the axis of the main field to compensate the main field, another set of brushes bearing on the commutator and connected in series circuit with the auxiliary stator coil to a source of current to produce a magnetization along the axis of the auxiliary field, means whereby the ampere turns of the auxiliary winding may be varied, and means whereby the voltage impressed upon the main stator winding may be varied.

3. In an alternating current motor in combination, a stator winding having connections for supplying current thereto, said winding comprising main and auxiliary coils whose magnetic fields are in quadrature, a rotor having a winding provided with a commutator, a set of connected brushes bearing on said commutator and short-circuiting the rotor winding on the axis of the main field to compensate the main field, another set of brushes bearing on the commutator and connected in series circuit with the auxiliary stator coil to a source of current to produce a magnetization along the axis of the auxiliary field, and means whereby the voltage impressed upon the auxiliary stator winding may be varied.

4. In an alternating current motor, in combination, a rotor winding provided with a commutator, brushes bearing on the commutator, a set of said brushes connected to a source of current and forming the exciting circuit, a second set of said brushes short circuiting the rotor winding on a line displaced from the first set and forming the compensating circuit, a main stator winding arranged to produce a magnetization on the line of the second set of brushes, an auxiliary stator winding arranged to produce a magnetization along the line of the first set of brushes, and means whereby the magnetic saturation of the stator core may be controlled.

5. In an alternating current motor in combination, a rotor winding provided with a commutator, brushes bearing on the commutator, a set of said brushes connected to a source of current and forming the exciting circuit, a second set of said brushes short circuiting the rotor winding on a line displaced from the first set and forming the compensating circuit, a main stator winding arranged to produce a magnetization on the line of the second set of brushes, an auxiliary stator winding arranged to produce a magnetization along the line of the first set of brushes, and means whereby the voltage per turn of the main stator winding may be varied.

6. In an alternating current motor in combination, a rotor winding provided with a commutator, brushes bearing on the commutator, a set of said brushes connected to a source of current and forming the exciting circuit, a second set of said brushes short circuiting the rotor winding on a line displaced from the first set and forming the compensating circuit, a main stator winding arranged to produce a magnetization on the line of the second set of brushes, an auxiliary stator winding arranged to produce a magnetization along the line of the first set of brushes, means whereby the ampere turns of the auxiliary winding may be varied, and means whereby the voltage per turn of the main winding may be varied.

7. In an alternating current motor in combination, a rotor winding provided with a commutator, brushes bearing on the commutator, a set of said brushes connected to a source of current and forming the exciting circuit, a second set of said brushes short circuiting the rotor winding on a line displaced from the first set and forming the compensating circuit, a main stator winding arranged to produce a magnetization on the line of the second set of brushes, an auxiliary stator winding arranged to produce a magnetization along the line of the first set of brushes, means whereby the ampere turns of the auxiliary winding may be reversed, and means whereby the voltage per turn of the main stator winding may be varied.

8. In an alternating current motor in combination, a main stator winding connected to a source of current, a rotor winding provided with a commutator, brushes bearing on said commutator, a set of said brushes connected together on the line of magnetization of the main stator winding so as to set up a field to compensate said main stator winding, another set of said brushes connected together on the line of magnetization at an angle to the main stator winding, an auxiliary stator winding connected in circuit with the second set of brushes and arranged to produce a magnetization along the line of the second set of brushes, the circuit containing the auxiliary winding and the second set of brushes being connected in shunt with the main stator winding, and means whereby the voltage per turn of the main stator winding may be varied.

9. In an alternating current motor in combination, a main stator winding connected to a source of current, a rotor winding provided with a commutator, brushes bearing on said commutator, a set of said brushes connected together on the line of magnetization of the main stator winding so as to set up a field to compensate said main stator winding, another set of said brushes connected to said source to produce a magnetization at an angle to the main stator winding, an auxiliary stator winding connected in circuit with the second set of brushes and arranged to produce a magnetization along the line of the second set of brushes, the circuit containing the auxiliary winding and the second set of brushes being connected in shunt with the main stator winding, means whereby the voltage per turn of the main stator winding may be varied, and means whereby the ampere turns of the auxiliary winding may be varied.

10. In an alternating current motor in combination, a main stator winding connected to a source of current, a rotor winding provided with a commutator, brushes bearing on said commutator, a set of said brushes connected together on the line of magnetization of the main stator winding so as to set up a field to compensate said main stator winding, another set of said brushes connected to said source to produce a magnetization at an angle to the main stator winding, an auxiliary stator winding connected in circuit with the second set of brushes and arranged to produce a magnetization along the line of the second set of brushes, the circuit containing the auxiliary winding and the second set of brushes being connected in shunt with the main stator winding, means whereby the voltage per turn of the main stator winding may be varied, and means whereby the ampere turns of the auxiliary winding may be reversed 11. In an alternating current motor in combination, a main stator winding connected to a source of current, a rotor winding provided with a commutator, brushes bearing on said commutator, a set of said brushes connected together on the line of magnetization of the main stator winding so as to set up a field to compensate said main stator winding, another set of said brushes connected to said source to produce a magnetization at an angle to the main stator winding, an auxiliary stator winding connected in circuit with the second set of brushes and arranged to produce a magnetization along the line of the second set of brushes, the circuit containing the auxiliary winding and the second set of brushes being connected in shunt with the main stator winding, and means whereby the voltage impressed upon the circuit containing the second set of brushes may be varied.

12. In an alternating current motor in combination, a main stator winding connected to a source of current, a rotor winding provided with a commutator, brushes bearing on said commutator, a set of said brushes connected together on the line of magnetization of the main stator winding so as to set up a field to compensate said main stator winding, another set of said brushes connected to said source to produce a magnetization at an angle to the main stator winding, an auxiliary stator winding connected in circuit with the second set of brushes and arranged to produce a magnetization along the line of the second set of brushes, the circuit containing the auxiliary winding and the second set of brushes being connected in shunt with the main stator winding, and means whereby the ampere turns of the auxiliary winding may be varied.

13. In an alternating current motor in combination, a main stator winding connected to a source of current, a rotor winding provided with a commutator, brushes bearing on said commutator, a set of said brushes connected together on the line of magnetization of the main stator winding so as to set up a field to compensate said main stator winding another set of said brushes connected to said source to produce a magnetization at an angle to the main stator winding, an auxiliary stator winding connected in circuit with the second set of brushes and arranged to produce a magnetization along the line of the second set of brushes, the circuit containing the auxiliary winding and the second set of brushes being connected in shunt with the main stator winding, and means whereby the ampere turns of the auxiliary winding may be varied and reversed.

14. In an alternating current motor, in combination, a stator winding, a rotor having a winding provided with a commutator, brushes bearing on said commutator, a set of said brushes connected to a source of current and forming with the rotor winding the exciting circuit, a second set of said brushes forming with said rotor winding a circuit compensating the stator winding, the circuit containing the first set of brushes being connected in shunt to said stator winding across said source of current, and a regulating winding for controlling the self-induction of the exciting circuit.

15. In an alternating current motor, in combination, a stator winding, a rotor having a winding provided with a commutator, brushes bearing on said commutator, a set of said brushes connected to a source of current and forming with the rotor winding the exciting circuit, a second set of said brushes forming with said rotor winding a circuit compensating the stator winding, the circuit containing the first set of brushes being connected in shunt to said stator winding across said source of current, and a regulating coil having its magnetic axis arranged along the line of magnetization of the exciting circuit.

In testimony whereof we affix our signatures in presence of two witnesses.

ENGELBERT ARNOLD.
JENS LASSEN LA COUR.

Witnesses to the signature of E. Arnold:
　JOSEPH SIMON,
　M. SCHUMANN.

Witnesses to the signature of J. L. la Cour:
　ALFRED FRAENCKEL,
　MARTIN RADT.